(12) United States Patent
Yucebay

(10) Patent No.: US 6,483,904 B1
(45) Date of Patent: *Nov. 19, 2002

(54) METHOD AND SYSTEM FOR HIGH-SPEED INTERFACE ACCESS TO A COMPUTER NETWORK USING A SUBSCRIBER TELEPHONE LINE

(75) Inventor: Mustafa S. Yucebay, Naperville, IL (US)

(73) Assignee: 3Com Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/067,134

(22) Filed: Apr. 27, 1998

(51) Int. Cl.[7] ............................................ H04M 11/00
(52) U.S. Cl. .............................. 379/93.02; 379/207.15; 379/93.07
(58) Field of Search .......................... 379/93.07, 93.06, 379/93.02, 93.14, 93.28, 93.01, 207.15, 207.13; 370/352, 401

(56) References Cited

U.S. PATENT DOCUMENTS 5,428,608 A * 6/1995 Freeman et al. ......... 379/93.08
5,949,763 A * 9/1999 Lund ......................... 379/93.01
5,954,799 A * 9/1999 Goheen et al. ............. 370/401
5,982,768 A * 11/1999 Bellenger et al. ........... 375/222
5,999,598 A * 12/1999 Henrick et al. ........... 379/93.07
6,028,858 A * 2/2000 Rivers et al. ............... 370/352
6,115,460 A * 9/2000 Crowe et al. ............... 370/352

* cited by examiner

Primary Examiner—Stella Woo
(74) Attorney, Agent, or Firm—McDonnell Boehnen Hulbert & Berghoff

(57) ABSTRACT

A method and system for providing a telephone subscriber line high-speed access to a computer network is described. The telephone subscriber line is provided telephone service through a network access equipment. The network access equipment includes a telephone line function interface, access control logic, a high-speed interface, and a Remote Access Server. In a described embodiment, the network access equipment also provides access to a high-speed interface connected to a Remote Access Server providing access to the computer network. The access control logic recognizes the telephone numbers of telephone lines accessing the computer network which are provided telephone service through the network access equipment. These telephone lines can be connected to a high-speed interface connected to the Remote Access Server providing access to the computer network. The network access equipment provides the subscriber telephone line a high-speed data connection to the computer network through the high-speed interface and does not require data to be routed through the Public Switched Telephone Network.

31 Claims, 3 Drawing Sheets

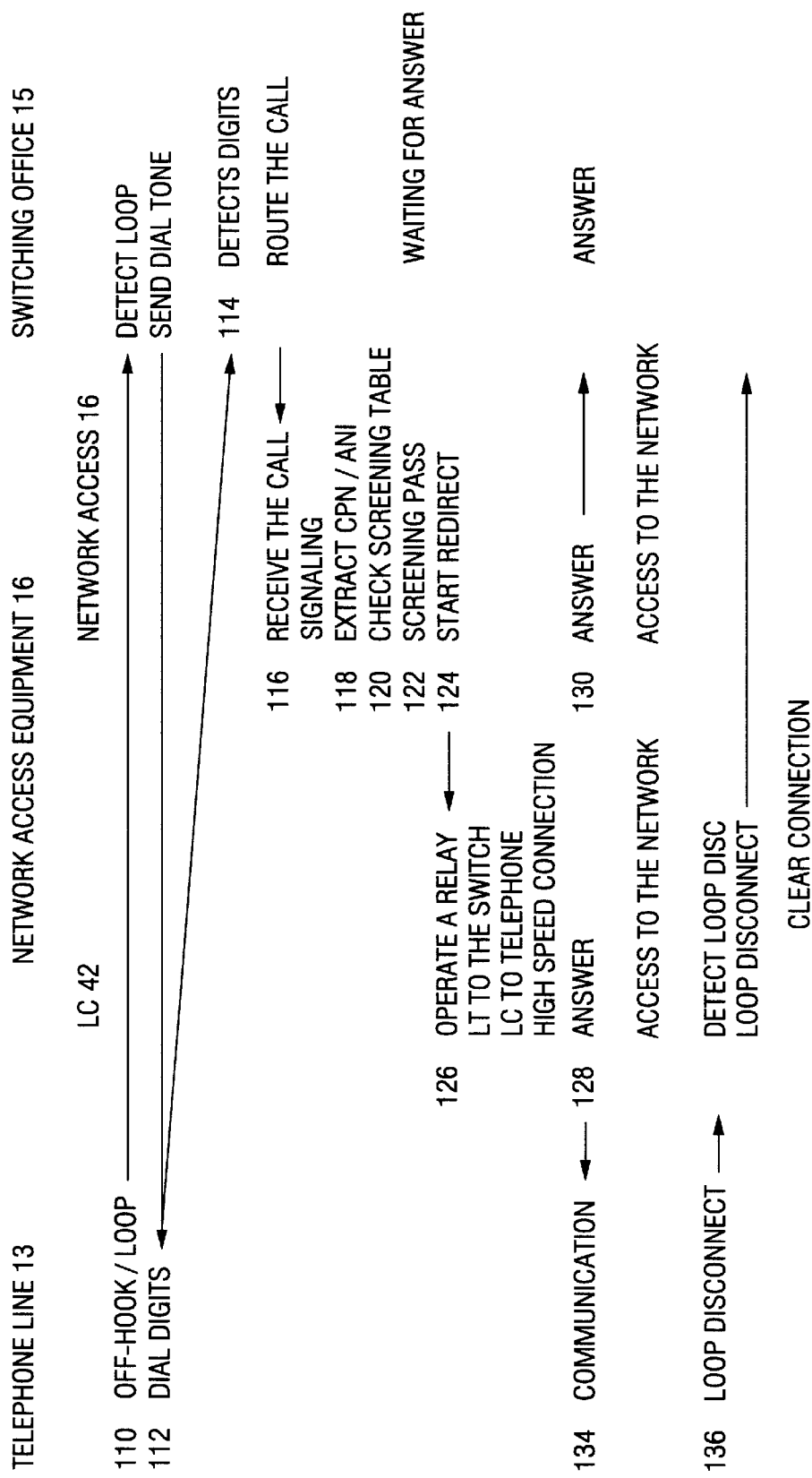

METHOD AND SYSTEM FOR HIGH-SPEED INTERFACE ACCESS TO A COMPUTER NETWORK USING A SUBSCRIBER TELEPHONE LINE

FIELD OF INVENTION

This invention relates to providing remote access to computer networks. More specifically, it relates to a method and system for accessing a computer network such as the Internet or an intranet from a subscriber telephone line.

BACKGROUND OF THE INVENTION

A variety of computing devices or resources are often operatively connected together to form a computer network. The computer network may be a Local Area Network ("LAN") that connects computing devices located within a small geographical area, or a Wide Area Network ("WAN") that connects computing devices located within a large geographical area.

To a gain access to the computer network from a remote location, a computer user with a telephone modem can use the Public Switched Telephone Network ("PSTN") to establish a telephone connection to a dial-up telephone line providing access to the computer network. The PSTN is any of the networks, usually carrying telephony voice and modulated digital computer data, provided by the Regional Bell Operating Companies, AT&T, GTE, and other communication networks comprising multiple switching offices.

The dial-up telephone line is typically connected to Private Branch exchange ("PBX") which switches incoming telephone calls to a Remote Access Server ("RAS"). The RAS provides telephone dial-in access from the PSTN to the computer network. The RAS typically includes a plurality of modems to receive a plurality of incoming telephone calls from the PSTN telephone lines or trunks and/or a plurality of Network Interface Cards ("NICs") to provide access to the computer network. The RAS interfaces and connects the plurality of modems to the plurality of NICs interfacing the computer network. Typically, a number of different types of modems and NICs are provided to accommodate different protocols, types of networks, and interfaces.

A telephone call to access a computer network thus originates at an originating switching office, may be sent through the PSTN via one or more intermediate switching offices, an end switching office, a PBX, and then to the RAS. At the end office, the incoming calls are received from the PSTN by the PBX and terminated to the RAS to provide access to the computer network.

There are a number of problems associated with using the PSTN to provide a data connection to access to a computer network such as the Internet or an intranet. A telephone connection routed through the PSTN passes through multiple switching offices, an end switching office, possibly a PBX, and then to the RAS to provide a data connection to the computer network. Transmission of a data signal through multiple switching offices may require the signal to be converted between various transmission formats through each switching office, significantly degrading the signal at each conversion and reducing its ability to accurately carry computer information. Thus, the routing of telephone calls through multiple switching offices in the PSTN may degrade the quality of the transmitted signal and reduce the bandwidth carrying capability of the connection. A device and method for proving a connection to the RAS without routing the telephone call through multiple switching offices of the PSTN is desirable.

SUMMARY OF THE INVENTION

In accordance with an illustrative embodiment of the present invention, problems associated with providing access to a computer network via a telephone call connection routed through the PSTN are addressed. A system and method for providing a high-speed data connection to access a computer network is described. The system includes network access equipment providing a connection to a remote access server ("RAS") which provides a high-speed interface to access the computer network. Telephone calls to access a computer network can be routed by the network access equipment through the high-speed interface without requiring the computer data to traverse a telephone connection through the PSTN.

In an illustrative embodiment of the present invention, the network access equipment allows high-speed data access to a computer network from a subscriber telephone line. The network access equipment includes an access screening table, a telephone line function interface, access control logic, a high-speed interface, and a RAS. The access screening table may identify telephone subscriber lines capable of accessing the computer network through the network access equipment. The telephone line function interface provides the connection of the telephone line to the high-speed interface under the control of the access control logic. The high-speed interface provides the high-speed data connection to the RAS, which provides access to the computer network. The present invention is not limited to the networks, network devices, network connections, and network access equipment described, and other network components may also be used.

The illustrative method includes, dialing a telephone call to access a computer network from a subscriber telephone line and determining whether the subscriber telephone line is serviced through the network access equipment. If the subscriber telephone line is serviced from the network access equipment, the telephone call is redirected by the network access equipment to a high-speed data connection to the computer network.

An illustrative embodiment of the present invention offers several advantages over the prior art. The illustrative embodiment allows high-speed modem access to the computer network from telephone subscriber lines serviced from the network access equipment. The telephone subscribers serviced from the network access equipment can access the computer network through high-speed modems without routing the data connection through the PSTN. The high-speed connection provided by the network access equipment is free of the degradation caused by routing a connection through the PSTN requiring the data signal to be converted from various transmission formats as it is transmitted through different types of equipment.

The foregoing and other features and advantages of an illustrative embodiment of the present invention will be more readily apparent from the following detailed description, which proceeds with references to the accompanying drawings.

BRIEF DESCRIPTION OF THE DRAWINGS

FIG. 4 is a diagram of the call transaction diagram of the network access system of FIG. 1.

DETAILED DESCRIPTION OF AN ILLUSTRATIVE EMBODIMENT

The Public Switched Telephone Network ("PSTN") 15 provided by AT&T, GTE, a Regional Bell Operating company, and others includes a hierarchy of telephony switching offices. Individual subscribers 12 are connected by telephone lines 13 or "local loops" or individual telephone lines to a nearby telephone exchange, often referred to as called an end office, or "switching office" 14. One or more switching offices 14 may be connected to a "local central office" (also referred to as a "local central telephony office") or connected to a toll office. An end office may also function as a local central office (e.g., in a remote area). Local central offices and/or end offices are connected to toll telephony offices by trunk circuits, often simply referred to as trunks. As is known in the telecommunication arts, a trunk is a circuit connecting two switching elements such as telecommunication exchanges including a local central office. Trunks are combined into trunk groups, creating a high capacity circuit capable of transmitting multiple channels of information between two telecommunication exchanges. Toll offices are connected to a "primary telephony center" by trunks. Primary telephony centers are connected to "sectional telephony centers" with very high capacity trunks. Sectional telephony centers are connected to "regional telephony centers," which typically are the highest level in the PSTN 15 switching hierarchy, with very high capacity trunks.

Figure 1:
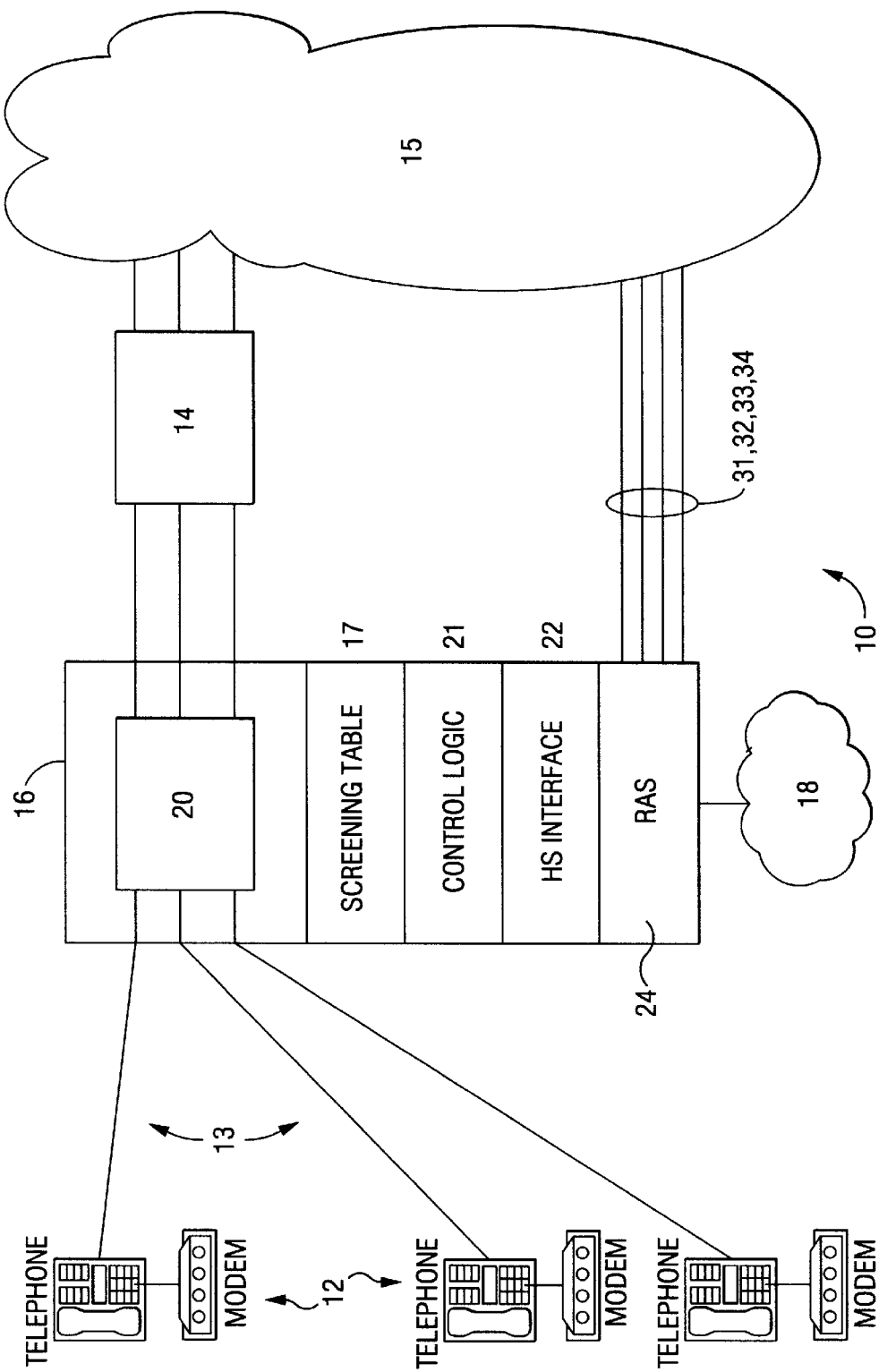
FIG. 1 is a diagram illustrating a network access system according to an embodiment of the present embodiment.

FIG. 1 shows a block diagram of a network access system 10 in an illustrative embodiment of the present invention. The network access system 10 includes a plurality of telephone subscribers 12 each having a telephone subscriber line 13 which is provided telephone service from a switching office 14 through network access equipment 16. The network access equipment 16 is preferably connected between the subscriber telephone lines 13 and the switching office 14. Network access equipment 16 also provides a high-speed interface connection to a computer network 18. The computer network 18 may be any of many private computer networks, the Internet or an intranet.

In an illustrative embodiment, the network access equipment 16 comprises a telephone line function interface 20, access control logic 21, a high-speed interface 22, and a Remote Access Server ("RAS") 24. The RAS 24 terminates a plurality of telephony connections from the PSTN 15 in the form of telephony trunks or telephone lines 31, 32, 33, 34. Telephony trunks or telephone lines 31, 32, 33, 34 provide access to the RAS 24 from the PSTN 15. Typically the RAS is connected to the PSTN as a Private Branch eXchange ("PBX") capable of handling a number of the incoming telephone calls from the PSTN. Large computer networks with great numbers of remote dial-in computer users will preferably use high capacity telephony trunks 31, 32, 33, such as the 24 channel 1.544 Mbps T1 trunk used in North America, to provide a large volume of dial-in capacity to the computer network 18. Such trunks may be R1, Multi-Frequency ("MF") or Signaling System Number 7 ("SS7") signaling trunks. In other countries, a 2.048 Mbps E1 trunk may be used in place of the T1 trunk. Such trunks may use R2 or Multi-Frequency Compelled ("MFC") signaling. The "R" stands for Regional standard recommendation and the "2" is the second standard. R2 is commonly used over trunks in an international telecommunications system. Smaller computer networks with fewer numbers of remote dial-in users may use a lower capacity Primary Rate Interface ("PRI") such as a Business 1 ("B1") or an Integrated Service Digital Network ("ISDN") telephone line 34. It should be understood that the telephone trunks or lines 31, 32, 33, 34 connected to the RAS 24 may be connected to different switching offices throughout the PSTN 15 as previously described.

For ordinary telephone calls, the switching office 14 provides the telephone subscriber 12 Plain Old Telephone Service ("POTS"). The network access equipment 16 merely connects the telephone subscriber line 13 through to the switching office 14, having no effect on ordinary POTS.

For telephone calls accessing the computer network, telephone subscribers 12 dial the telephone number associated with one of the plurality of telephony trunks or lines 31, 32, 33, 34 terminated at the RAS 24. From the telephone line 13, the subscriber 12 uses a telephone modem to dial the telephone trunk/lines 31, 32, 33, 34 providing access to the computer network 18 from the PSTN 15. The telephone modem may be any one of X2, V.34, X.90 or other high-speed telephone modems can be used. It is envisioned that as higher speed communication protocols (for example, greater than 56 Kbytes/sec) are developed they will be utilized with the present embodiment to achieve high-speed data communication. The PSTN 15 routes the telephone call to the telephone trunks/line 31, 32, 33, 34 terminated at the RAS 24. At the telephone trunks/line 31, 32, 33, 34 of the RAS 24, the call is answered and the calling party telephone number is identified. In a preferred embodiment, the telephone/trunk lines 31, 32, 33, 34 have calling party number or automatic number identification ("ANI") capability to determine the telephone number originating the call to the telephone line/trunk 31, 32, 33, 34.

The access screening table 17 identifies telephone numbers that are provided telephone service from the switching office 17 through the network access equipment 16. Preferably, the access screening table 17 is implemented in the form of a computer data structure such as an array or linked pointer list identifying the telephone numbers of subscribers provided telephone service through the network access equipment 16. If the telephone subscriber line 13 number is not listed in the access screening table 17, the telephone call is simply routed through the PSTN 15 by switching office 14 as a conventional telephone connection and access to the computer network 18 is provided in the conventional manner. Only the telephone subscriber lines 13 serviced from network access equipment 16 and listed in the access screening table 17 are provided high-speed access to the computer network 18. Listing the subscriber telephone line 13 number in the access screening table 17 indicates to the network access equipment 16 that the subscriber telephone line 13 is capable of a high-speed connection through the computer network 18. If the telephone subscriber line 13 is found in the access screening table 17, the access control logic 21 will route the data connection to access the computer network 18 through the RAS 24 of the network access equipment 16.

Figure 2:
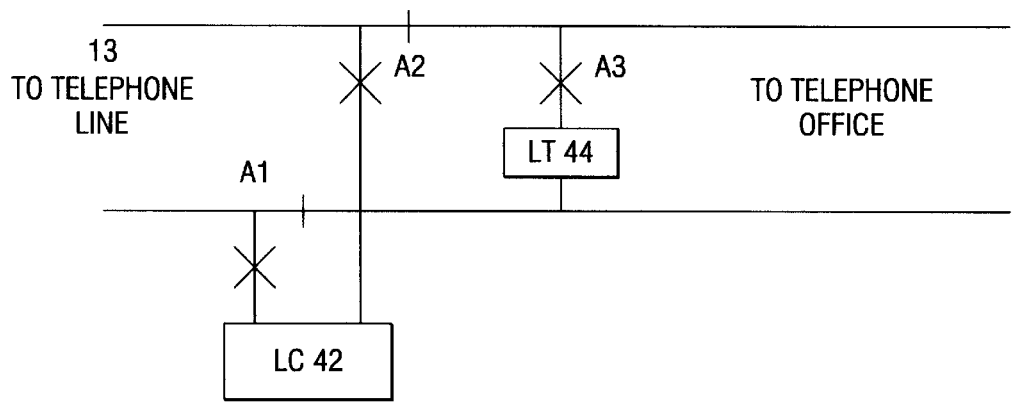
FIG. 2 is a diagram illustrating a line function interface of the network access system of FIG. 1.

Referring now to FIG. 2, the telephone line function interface 20 of the network access equipment 16 allows the telephone subscriber line 13 to access the telephone switching office 14 (FIG. 1) providing dial tone and POTS. The telephone line function interface 20 includes a relay 40 connecting the tip and ring pair of the telephone line 13 to a line card circuit 42 and a line termination circuit 44. The tip and ring pair of the telephone line 13 is also connected through the telephone line function interface 20 to the switching office 14. During the initiation of telephone calls, the relay 40 is open to allow the tip and ring pair of the telephone line 13 to be passed through and provided telephony service from the switching office 14 subscriber line interface card ("SLIC") as is well known to those skilled in the art. Thus, telephone calls are initiated by the switching office 14 in the conventional POTS manner. The telephone subscriber 12 goes off-hook to draw loop current on the telephone line 13, which is detected by the SLIC of the switching office 14. In response, the switching office 14 SLIC provides dial tone to the telephone line 13, and receives the digits dialed by the telephone subscriber 12. In accordance with the dialed digits, the switching office 14 routes the call through the PSTN 15. Conventional voice telephone calls are handled in this manner.

In accordance with an illustrative embodiment of the invention, the telephone line function interface 20 also provides the telephone line 13 high-speed access to the computer network 18. Telephone calls to access the computer network 18 are initiated from the telephone line 13 in a manner similar to ordinary voice telephone calls. Referring again to FIG. 1, the telephone subscriber's modem goes off-hook, drawing dial tone from the switching office 14. The telephone modem dials the digits to the telephone number assigned to the dial-up access trunk/lines 31, 32, 33, 34 connected to the PBX or RAS 24. The switching office 14 detects the dialed digits and establishes a telephone connection through the PSTN 15 to the dialed telephone number, in this case, one of the dial-up access numbers 31, 32, 33, 34 accessing the RAS 24. Up to this point, the telephone line function interface 16 has not acted upon the telephone call, but has simply allowed the telephone line 13 to pass through to the switching office 14 providing POTS service. Thus, telephone calls accessing the computer network 18 are initiated and established in the same way as ordinary voice telephone calls.

Again, when the telephone call from the PSTN 15 is received by the RAS 24 at the trunk/lines 31, 32, 33, 34, the calling party telephone number is determined. Preferably, the access trunk/lines 31, 32, 33, 34 of the RAS 24 has a caller identification feature or automatic number identification ("ANI") so that the calling party telephone 12 telephone number may be obtained. Caller identification and ANI systems are well known to those of skill in the art.

The access control logic 21 of the network access equipment 16 obtains the ANI of the calling party and searches the access screening table 17 for the ANI of the calling party to determine whether the calling party is provide service from the network access equipment 16. If the calling party ANI is a telephone number found in the screening table 17, the telephone call to the computer network 18 was originated from a telephone line 13 serviced through the network access equipment 16. Such telephone calls are suitable for high-speed connection to the computer network 18 through the telephone line function 20 of the network access equipment 16.

The access control logic 21 implements the high-speed interface to the computer network 18 by activating or closing the relay 40 of the telephone line function interface 20. Referring again to FIG. 2, in this illustrative embodiment relay 40 includes three primary contacts, A1, A2, and A3. Contact A3 is an early-make relay contact that connects the line termination 44 across the tip and ring pair of the telephone line 13. The line termination 44 provides an appropriate impedance to terminate the telephone line 13 into the switching office 14. The particular impedance value necessary to maintain the call connection to the switching office 14 will vary according to the particular switching office environment and other conditions well known to those skilled in the art. Typical impedance values in North America may range from 600–900 ohms or 600–1200 ohm. Terminating the telephone line 13 into 14 maintains the telephone call connection established by the switch office 14 through the PSTN 15. Relay 40 contacts A1 and A2 are break-make contacts to isolate the subscriber telephone line 13 from the switching office 14 and connect the subscriber telephone line 13 to the line card circuit 42. The relay contact A3 is an early-make contact to insure that the line termination 44 is switched onto the telephone line 13 toward the switch office 14 before relay 40 contacts A1 and A2 break and isolate the subscriber telephone line 13 from the switching office 14. In this manner, the line termination 44 maintains the telephone line connection to the switch office 14 during the high-speed access to the computer network. In a preferred embodiment, the switching office 14 therefore maintains the telephone call connection through the PSTN to allow call signaling and control.

In this illustrative embodiment, using the line termination 44 to maintain the telephone connection to the switch office 14 provides several advantages for call processing and signaling. For example, because the switching office 14 maintains the telephone connection during the high-speed connection to the computer network, incoming telephone calls to the telephone subscriber 12 from the PSTN will still receive a busy signal. The switching office 14 thus knows the subscriber telephone line 13 is connected to the access line 31, 32, 33, 34 of the RAS 24 for the duration of the connection. Other calling features such as call forwarding, transfer to voice mail, or call waiting will also still operate as with conventional telephone voice calls. When the subscriber 12 terminates the telephone call, the modem goes off-hook, removing the loop on the telephone line 13. The loop detector 56 of the line card 42 detects the loop disconnect and releases the relay 40 to clear the access path to the high-speed interface 22. Releasing the relay 40 also sends the loop disconnect to the switching office 14. In response, the switching office 14 will release the connection as it would with an ordinary telephone call. In addition, disconnect received by trunks 31, 32, 33, 34 will also cause the release of the relay 40 to disconnect the telephone call. The access control logic can be implemented as a set of computer software instructions stored on a computer readable medium such as a memory, disc drive Programmable Read-Only Memory ("PROM"). In other embodiments, eliminating the connection of the call through the PSTN can also be implemented.

The access control logic 21 can be implemented in many different forms. The access control logic 21 can be implemented as a set of computer software instructions stored in a computer readable medium such as a memory, disc drive, programmable read-only memory ("PROM"). In the illustrative embodiment, an operating environment for access control logic 21 of the present invention includes a processing system with at least one high-speed Central Processing Unit ("CPU") and a memory system. Network access equipment 16 thus includes access control logic 21 as a set of computer software instructions. The software instructions stored as software modules that are executed as data bits by the CPU. In accordance with the practices of persons skilled in the art of computer programming, the present invention is described below with reference to acts and symbolic representations of operations that are performed by the processing system, unless indicated otherwise. Such acts and operations are sometimes referred to as being "computer-executed", or "CPU executed."

It will be appreciated that the acts and symbolically represented operations include the manipulation of electrical signals by the CPU. The electrical system represent data bits which cause a resulting transformation or reduction of the electrical signal representation, and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or (e.g., Random Access memory ("RAM")) non-volatile (e.g., Read Only Memory("ROM")) storage system readable by the CPU. The computer readable medium includes cooperating or interconnected computer readable media, which exist exclusively on the processing system or is distributed among multiple interconnected processing systems that may be local or remote to the processing system.

In a specific embodiment of the present invention, network access equipment 16 includes RAS 24 implemented as a "Total Control Telephony Chassis" by the U.S. Robotics Division, of 3Com Corporation of Santa Clara, Calif. The Total Control Telephony Chassis includes multiple network interface cards connected by a common bus with one or more software modules to provide network connections. The network interface cards include modems, T1 cards, DS1 cards, ISDN cards, Asymmetric Digital Subscriber line cards, and other network interface cards. See "Modem Input/Output Signal Processing Techniques," U.S. Pat. No. 5,528,595, granted to Dale M. Walsh et al., incorporated herein by reference, for more information. Of course RAS systems provided by other vendors such as Ascend, Cisco Systems, Inc., Bay Networks Inc. are also suitable. Connections 31, 32, 33, 34 connect PSTN switching offices to a 3Com/U.S. Robotics T1 or DS1 card in RAS 24 over a high-speed trunk. However, other connection cards could also be used in RAS 24 (e.g., T3, DS1, DS3 or ISDN cards).

Figure 3:
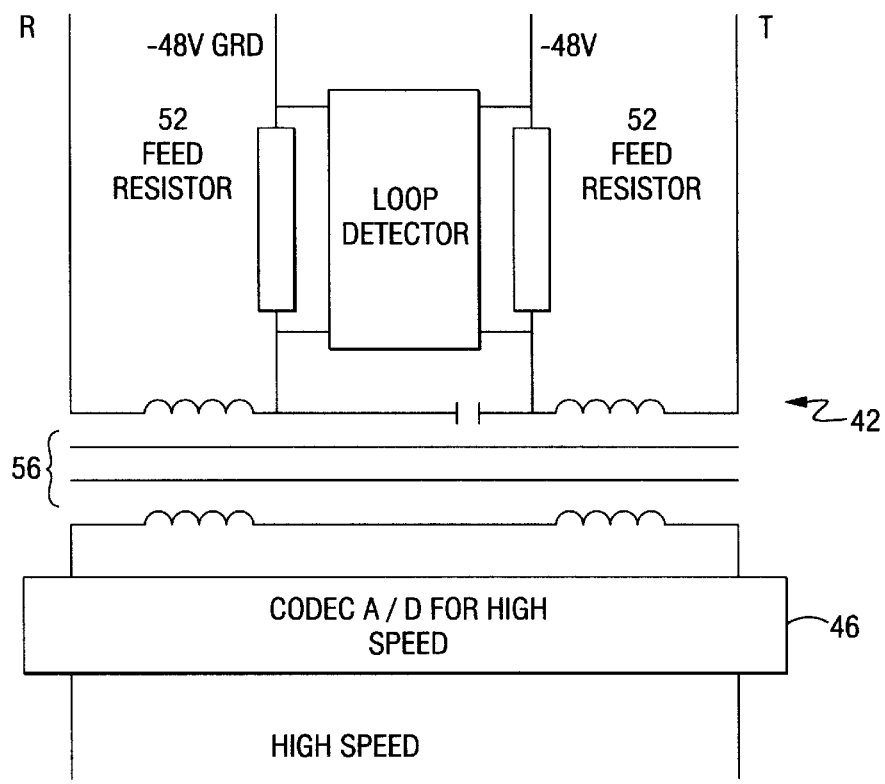
FIG. 3 is a block diagram illustrating a line cord of the line function interface of FIG. 2.

Referring to FIG. 3, shown is a line card circuit 42 to provide the subscriber telephone line 13 a high-speed interface 22 accessing the computer network 18. Operating relay 40 of the telephone line function interface 40 switches the telephone line 13 tip and ring pair to the line card circuit 42. Thus the telephone line 13 is disconnected from the switching office 14. In this embodiment of the invention, it should understood even though the telephone line 13 is no longer connected to the switching office 14, the telephone connection routed through the PSTN 15 is maintained by line termination 44 as described previously.

In the preferred embodiment, the line card 42 provides the interface of the telephone line 13 to the high-speed RAS providing access to the computer network. In this embodiment, the line card circuit 42 need only provide limited line functions to the subscriber telephone line 13.

For example, the line card circuit 42 provides –48 volts office battery supply, isolation and line protection, and limited loop detection such as the detection of the release of the telephone call. Other POTS line functions such as ringing, ring trip, digit detection, are not necessary in this embodiment of the line card circuit 42. The line card circuit 42 includes a feed resistor 52 and loop detector 56, a –48 volt battery supply 54, and an isolation means such as a transformer 58 to isolate the telephone line 13 from the codec 46. In this illustrative embodiment, the line card circuit 42 also includes a modem or codec 46 to provide a high-speed interface 22 to the computer network. The codec 46 converts the modem signals from the subscriber telephone line 13 to a digital format that can be transferred to the RAS 24 at high data rates. Depending on the digital format, the codec 46 may take different forms. For example, the telephone modem may be an X2 or X.90 protocol modem communicating at up to 56 Kbyte/sec. The codec in this illustrative embodiment would then be a codec compatible and capable of communicating with the particular sending modem. Preferably, the high-speed interface 22 may comprise a plurality of modems and codecs to allow communication with various types of computer modems. In a particular embodiment, the high-speed interface may be implemented as a component of the RAS 24.

FIG. 4 is a transaction diagram showing an illustrative embodiment of the invention. The telephone subscriber initiates the call from the access telephone line 13 (FIG. 1) to the computer network 18 as an ordinary telephone call. At step 110, the computer modem goes off-hook and draws loop current from the switching office 14. The switching office 14 detects the loop current and provides dial tone. At step 112, the computer modem sends the dialed digits to access the trunks or lines connected to the RAS 24 providing access to the computer network 18. At step 114, the switching office 14 receives and detects the digits and routes the call through the PSTN 15 to the trunk access lines.

At step 116, the network access equipment 16 (FIG. 1) receives the call and extracts the calling telephone number originating the telephone call, preferably using ANI at step 118. At step 120, the network access equipment 16 checks the calling telephone number against an access screening table 17 to identify whether the call can be directly connected to the high-speed interface 22. At step 122, if the calling party telephone number is found in the access screening table 17, the call has originated from a telephone subscriber who is serviced from the network access equipment 16. At step 124, such subscribers are redirected to the computer network 18 through the high-speed interface 22.

At step 126, to connect to the high-speed interface 22, the line card 42 operates the A relay 40 connecting the line termination 44 to the switching office 14 and the line card 42 to the telephone line 13. The telephone line 13 is connected to the high-speed interface 22 to access the RAS 24. At steps 128, 130, 132 the network access equipment and switching office answers the call. Communications can begin at step 134.

At step 136, to disconnect the connection to the computer network, the computer mode goes on-hook, disconnecting the loop. The line card 42 detects the loop disconnect and disconnects the high-speed connection to the computer network. At step 138, the switching office 18 detects the loop disconnect signal and clears the telephone connection.

In another embodiment of the invention, users of compatible modems with service provided through the network access equipment 16 may access the computer network 18 on trunks that do not have calling party number capability. Such modems have the capability to provide the calling party number. Examples of such a modem may be available by the 3Com Corporation of Santa Clara, Calif. When dialing to access the RAS 31, 32, 33, 34, the compatible modem places an in-band tone onto the telephone line right after the digits corresponding to the access telephone number will be dialed. When the call is received by the RAS 24 via trunk/line 31, 32, 33, 34, a carrier answer tone from the RAS will be detected by the modem. Network access equipment 18 loops the call by connecting the receive line to the transmit line. When the compatible modem receives the tone it is send, it will discontinue sending the tone and dial the 4 digits calling party digits using DMTF signaling (30 msecs on/30 msecs off). The RAS 24 will receive the digits sent from the compatible modem and used the number for access screening before the call is redirected. High-speed access to the computer network can then provided through the network access equipment. On the other hand, if the compatible modem detects the end of the ring-back tone while it is sending the continuous tone, it will stop sending the tone. The user may have dialed a number other than the dial-up telephone number of the network access equipment 16. When this call is answered, the ring-back tone stops.

An illustrative embodiment of the invention can also be utilized for providing voice-over Internet Protocol capabilities and other voice services (e.g., standard telephone service, ISDN or Asymmetric Digital Subscriber Line ("ADSL"). Utilizing the system for voice traffic eliminates the routing of the telephone voice traffic over the PSTN.

An illustrative embodiment of the present invention provides several advantages over the prior art. The present embodiment allows a telephone subscriber to establish a high-speed access data connection to a computer network without routing the data through the PSTN. The data connection can thus be routed through the network access equipment, eliminating the degradation in bandwidth caused by transmission through the PSTN. The present embodiment can provide high-speed access from conventional subscriber lines and can be integrated with existing RAS providing computer network access. The routing of ordinary telephone calls are unaffected, and the interfaces to the PSTN require little, if any modification.

It should be understood that the programs, processes, methods and apparatus described herein are not related or limited to any particular type of computer or network apparatus (hardware or software), unless indicated otherwise. However, the present invention is not limited to these network devices and computer networks, and other network devices and computer networks could also be used. Various types of general purpose or specialized computer apparatus may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. A network access equipment for providing a telephone subscriber line a data connection to access a computer network, the network access equipment comprising:

an access screening table comprising a listing of telephone subscriber lines for identifying telephone subscriber lines capable of accessing the computer network through the network access equipment;

a telephone line function interface for providing telephone subscriber lines access to the computer network, the telephone line function interface communicating with a switching office;

access control logic for connecting telephone calls from telephone subscriber lines through the telephone line function interface to the computer network;

wherein the access control logic connects telephone calls from telephone subscriber lines listed in the access screening table to the computer network through the telephone line function interface;

a relay for connecting a line termination unit to the telephone subscriber line; and wherein the telephone calls from the subscriber lines are maintained by the line termination unit while the access control logic disconnects the subscriber lines from the switching office.

2. The network access equipment of claim 1 wherein the relay comprises a 600 to 1200 ohm line termination.

3. The network access equipment of claim 1 wherein the line termination maintains a telephone connection through the PSTN.

4. The network access equipment of claim 1 wherein the relay connects the telephone subscriber line to a line card circuit, wherein the line card circuit connects the telephone subscriber line to the computer network.

5. The network access equipment of claim 4 wherein the relay is a make-break relay which connects the line termination to the telephone subscriber line prior to connecting the telephone subscriber line to the line card circuit.

6. The network access equipment of claim 4 wherein the line card circuit further comprises:

feed resistors for terminating the telephone subscriber line;

a loop detector for detecting loop current on the telephone subscriber line; and a codec for translating analog signals from the telephone subscriber line to digital signals to access the computer network over the data connection.

7. The network access equipment of claim 6 wherein the line card further comprises:

a transformer for isolating the telephone line from the codec.

8. The network equipment of claim 1 further comprising a remote access server providing access to the computer network.

9. The network access equipment of claim 1 further comprising a data connection to provide access from the telephone line function interface to the computer network.

10. The network of equipment of claim 9 wherein the data connection comprises a data modem.

11. The network of equipment of claim 9 wherein the data connection comprises a codec.

12. The network access equipment of claim 1 further comprising a remote access server to provide access to the computer network.

13. The network access equipment of claim 12 wherein the remote access server also provides dial in access from the PSTN.

14. The network access equipment of claim 13 wherein the remote access server provides access from the PSTN over a telephone line, wherein the telephone line comprises an automatic number identification.

15. The network access equipment of claim 14 wherein the telephone line comprises a trunk line.

16. The network access of equipment 14 further comprising a PBX to switch calls from the PSTN to the RAS.

17. A method of accessing computer network from a telephone line, the method comprising the steps of:
dialing a telephone call to access a computer network from the telephone line;
connecting the telephone call to a network access equipment and to a switching office;
determining the telephone line is a telephone line provided telephone service through the network access equipment using an access screening table containing a listing of telephone lines provided service through the network access equipment;
establishing a data connection from the telephone line to the computer network through the network access equipment; and
maintaining the telephone call from the telephone line while disconnecting the telephone line from the switching office.

18. The method of claim 17 wherein the step of establishing a data connection comprises operating a relay to connect a line termination to the telephone line.

19. The method of claim 17 wherein the step of establishing a data connection comprises operating a relay to connect the call to a line card circuit accessing the computer network.

20. The method of claim 17 wherein the step of establishing a data connection comprises connecting the telephone line to a codec.

21. A The method of claim 17 wherein the step of establishing a data connection comprises connecting the telephone line to a high-speed modem.

22. The method of claim 17 further comprising the steps of extracting the calling party telephone number dialing the access to the computer network.

23. The method of claim 22 wherein the step of extracting the calling party telephone number comprises using automatic number identification.

24. The method of claim 17 further comprising the steps of:
detecting the absence of loop current on the telephone line; and
disconnecting the data connection to the computer network.

25. A computer readable medium having stored therein instructions for causing a central processing unit to execute the method of claim 17.

26. A computer readable medium having stored therein instructions for causing a central processing unit to execute the method of claim 24.

27. The method of claim 17 wherein the computer network is any of the Internet, an Intranet and a local area network.

28. A device comprising:
means for dialing at least one trunk line, the at least one trunk line being coupled to a PSTN;
means for receiving and answering a call at the at least one trunk line, the call to be routed to network access equipment;
means for identifying the call as to be routed to network access equipment; and
means for directly routing the selected telephone call to the network access equipment without involving the PSTN.

29. A system comprising:
a telephone network;
a computer network; and
a network access equipment coupled to the telephone network and the computer network, the network access device including an access screening table, the access screening table comprising a listing of telephone subscriber numbers for identifying telephone subscriber lines capable of accessing the computer network, the network access equipment receiving and routing a call from a subscriber to the network, the network access equipment receiving the call from the telephone network, determining the calling party number of the call, determining if the calling party number is in the access screening table, and directly routing the call from the subscriber to the computer network without using the telephone network if the calling party number is in the access screening table.

30. The system of claim 29 wherein the telephone network is the PSTN.

31. The system of claim 29 wherein the call is routed from the network to the network access equipment using at least one trunk line.

* * * * *